United States Patent
Mao

(10) Patent No.: US 9,537,423 B2
(45) Date of Patent: Jan. 3, 2017

(54) POWER CONVERSION SYSTEM

(71) Applicant: General Electric Company, Schenectady, NY (US)

(72) Inventor: Saijun Mao, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/031,778

(22) Filed: Sep. 19, 2013

(65) Prior Publication Data

US 2014/0085953 A1 Mar. 27, 2014

(30) Foreign Application Priority Data

Sep. 24, 2012 (CN) .......................... 2012 1 0359161

(51) Int. Cl.
H02M 7/00 (2006.01)
H02M 7/537 (2006.01)
H02M 7/797 (2006.01)

(52) U.S. Cl.
CPC ............. H02M 7/537 (2013.01); H02M 7/003 (2013.01); H02M 7/797 (2013.01); Y02B 70/1483 (2013.01)

(58) Field of Classification Search
CPC .... H02M 5/4585; H02M 5/458; H02M 7/537; H02M 7/797; H02M 7/03
USPC .......................................................... 363/37
See application file for complete search history.

(56) References Cited

U.S. PATENT DOCUMENTS

| | | | |
|---|---|---|---|
| 6,445,599 B1 | 9/2002 | Nguyen | |
| 7,638,904 B2 | 12/2009 | Shoji et al. | |
| 7,768,800 B2 | 8/2010 | Mazumder et al. | |
| 7,777,339 B2 | 8/2010 | Daubenspeck et al. | |
| 7,787,270 B2 | 8/2010 | Nadimpalliraju et al. | |
| 7,974,069 B2 | 7/2011 | Mao et al. | |

(Continued)

FOREIGN PATENT DOCUMENTS

CN 101969281 A 2/2011
CN 102136805 A 7/2011
(Continued)

OTHER PUBLICATIONS

Kwon et al., "High-Efficiency Fuel Cell Power Conditioning System With Input Current Ripple Reduction", IEEE Transactions on Industrial Electronics, vol. 56, Issue 3, pp. 826-834, Mar. 2009.

(Continued)

*Primary Examiner* — Jessica Han
*Assistant Examiner* — Bart Iliya
(74) *Attorney, Agent, or Firm* — Meagher Emanuel Laks Goldberg & Liao, LLP

(57) ABSTRACT

A power conversion system includes a filter unit, a DC/DC converter, a DC link, an inverter, a control unit, and a traction motor. The DC/DC converter is used for boosting DC voltage of a DC source and electrically coupled to the DC source through the filter unit. The DC/DC converter includes multiple SiC MOSFETs configured in a synchronous rectification mode by channel reverse conduction control. The inverter is used for converting the boosted DC voltage from the converter to multi-phase AC voltage through the DC link. The control unit is used for providing PWM commands to the converter and the inverter, to convert the DC voltage to AC voltage configured to drive an AC driven device.

13 Claims, 7 Drawing Sheets

(56) References Cited

U.S. PATENT DOCUMENTS

| | | | |
|---|---|---|---|
| 8,023,295 | B1 | 9/2011 | Shekhawat et al. |
| 8,074,753 | B2 | 12/2011 | Tahara et al. |
| 8,767,424 | B2 * | 7/2014 | Kazama .................. 363/131 |
| 8,847,563 | B2 | 9/2014 | Callanan |
| 2003/0090244 | A1 | 5/2003 | Shenai et al. |
| 2006/0152085 | A1 | 7/2006 | Flett et al. |
| 2008/0080106 | A1 | 4/2008 | Mirafzal et al. |
| 2011/0013433 | A1 * | 1/2011 | Wagoner et al. .......... 363/123 |
| 2012/0026769 | A1 * | 2/2012 | Schroeder ............ H02J 3/383 |
| | | | 363/131 |
| 2012/0051097 | A1 | 3/2012 | Zhang et al. |
| 2012/0126733 | A1 | 5/2012 | El-Refaie et al. |
| 2012/0126741 | A1 | 5/2012 | El-Refaie et al. |
| 2013/0093241 | A1 * | 4/2013 | Lewis ........................ 307/22 |
| 2013/0107601 | A1 | 5/2013 | Wagoner et al. |
| 2014/0346891 | A1 * | 11/2014 | Kang ................. H03K 17/122 |
| | | | 307/113 |

FOREIGN PATENT DOCUMENTS

| | | | |
|---|---|---|---|
| CN | 202093921 U | | 12/2011 |
| CN | 103177848 | * | 6/2013 |
| EP | 2448100 A2 | | 5/2012 |
| JP | 2013236435 | | 11/2013 |
| WO | 2013139492 A1 | | 1/2013 |

OTHER PUBLICATIONS

Biela et al., "Mission Profile Optimized Modularization of Hybrid Vehicle DC/DC Converter Systems", IPEMC '09. IEEE 6th International Power Electronics and Motion Control Conference, pp. 1390-1396, May 17-20, 2009, Location: Wuhan.

Lai et al., "High-Efficiency Power Conversion for Renewable Energy and Distribution Generation", Future Energy Electronics Center, Presentation at PEDS, Nov. 2, 2009.

Nymand et al., "High-Efficiency Isolated Boost DC-DC Converter for High-Power Low-Voltage Fuel-Cell Applications", IEEE Transactions on Industrial Electronics, vol. 57, Issue 2, pp. 505-514, Feb. 2010.

Boroyevich et al., "High-density system integration for medium power applications", 6th International Conference on Integrated Power Electronics Systems (CIPS), pp. 1-10, Mar. 16-18, 2010, Location: Nuremberg.

Huselstein, J-J, et al., "Use of the MOSFET channel reverse conduction in an inverter for suppression of the integral diode recovery current", Jan. 1, 1993, pp. 431-436.

EP Search Report and Written Opinion dated Jan. 15, 2014 from corresponding Application No. 13185598.

Unofficial English Translation of Chinese Office Action issued in connection with corresponding CN Application No. 201210359161.0 on Jun. 30, 2015.

U.S. Appl. No. 14/088,718, filed Nov. 25, 2013, Mao.
U.S. Appl. No. 12/949,925, filed Nov. 19, 2011, EL-Refaie.
U.S. Appl. No. 12/949,862, filed Nov. 19, 2010, EL-Refaie.

Nowakowski et al., "Efficiency of synchronous versus nonsynchronous buck converters", Analog Applications Journal, 4Q 2009, pp. 15-18, High Performance Analog Products.

Agarwal et al., "SiC based Buck Boost Converter", The 8th International Power Engineering Conference (IPEC 2007), pp. 1014-1017.

\* cited by examiner

POWER CONVERSION SYSTEM

BACKGROUND

Embodiments of the present invention relate generally to power conversion systems, and in particular, to power conversion systems applied in electric vehicles or the like.

In recent years, there has been much research focused on countermeasures for environmental pollution and fossil fuels exhaustion. In particular, the automotive industry has concentrated efforts in the research of electric vehicles (EV) using batteries as the main energy source. In general, EV systems need a power conversion system which is used to transfer energy from the battery to a traction motor for driving the electric vehicle.

For example, FIG. 1 shows a conventional power conversion system 10 of an electric vehicle. The power conversion system 10 may include a battery 11, a traction motor 12, a DC/DC converter 13, a three-phase inverter 14, a DC link 15 including a capacitor C1, a filter unit 16, and a control unit 17. The DC/DC converter 13 is used to boost DC voltage of the battery 11 and is electrically coupled to the battery 11 through the filter unit 16. The inverter 14 is used to convert the boosted DC voltage from the converter 13 to three-phase AC voltage through the DC link 15. The traction motor 12 receives the converted three-phase AC voltage from the inverter 14 to drive the electric vehicle. The control unit 17 is used to provide pulse-width modulation (PWM) commands to the converter 13 and the inverter 14, to convert the DC voltage to three-phase AC voltage accordingly.

For implementing voltage conversion, the converter 13 and the inverter 14 each may include multiple switch elements such as twelve switch elements S1-S12 controlled by the PWM commands of the control unit 17. In the conventional power conversion system 10, these switch elements S1-S12 may include transistors such as silicon insulated gate bipolar transistors (IGBTs). However, the traditional silicon IGBTs S1-S12 may consume lots of energy during the energy transfer process, which decreases the efficiency. On the other hand, due to the silicon IGBTs S1-S12 generating a lot of heat, heat sinks (not shown) need to be arranged on the silicon IGBTs S1-S12. This requires additional space and increases the weight of the electric vehicle, which in turn reduces its power density and performance.

Furthermore, for achieving multiple phases of voltage, the filter unit 16 may include multiple inductors, such as three interleaved inductors L1, L2, and L3. However, these individual inductors L1, L2, and L3 may require additional space of the electric vehicle as well.

In addition, for controlling these switch elements S1-S12, the control unit 17 should provide proper PWM commands. For example, FIG. 2 shows a control schematic diagram of the control unit 17 for controlling the DC/DC converter 13. The control unit 17 may include a difference element 171 and a PWM command generation block 172. The difference element 171 is used to obtain a DC voltage error signal $V_{DC\_Err}$ calculated from a difference between a feedback DC voltage signal $V_{DC\_Fbk}$ on the capacitor C1 and a predetermined DC voltage command signal $V_{DC\_cmd}$. The PWM command generation block 172 is used to generate proper PWM commands (PWM_cmd) according to the DC voltage error signal $V_{DC\_Err}$. The feedback DC voltage signal $V_{DC\_Fbk}$ stands for the real measured voltage on the capacitor C1 and the predetermined DC voltage command signal $V_{DC\_cmd}$ stands for a predetermined DC voltage.

It is understood that the PWM command generation block 172 may include some calculating elements, such as proportional integral regulators, limiters, difference elements, comparators, etc., to calculate the PWM commands (PWM_cmd). In the conventional control unit 17, the predetermined DC voltage command signal $V_{DC\_cmd}$ is a constant voltage value (see FIG. 2). However, because the predetermined DC voltage command signal $V_{DC\_cmd}$ is a constant voltage value, and the DC/DC converter 13 outputs DC power while the inverter 14 outputs AC power, the capacitor C1 should have sufficient capacitance to handle the pulsation power.

For these and other reasons, there is a need for embodiments of the invention.

BRIEF DESCRIPTION

In accordance with an embodiment disclosed herein, a power conversion system is provided. The power conversion system includes a filter unit, a DC/DC converter, a DC link, an inverter, a control unit, and a traction motor. The DC/DC converter is used for boosting DC voltage of a DC source and electrically coupled to the DC source through the filter unit. The DC/DC converter includes multiple SiC MOSFETs configured in a synchronous rectification mode by channel reverse conduction control. The inverter is used for converting the boosted DC voltage from the converter to multiphase AC voltage through the DC link. The control unit is used for providing PWM commands to the converter and the inverter, to convert the DC voltage to AC voltage configured to drive an AC driven device.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention relate to a power conversion system. The power conversion system includes a filter unit, a DC/DC converter, a DC link, an inverter, a control unit, and a traction motor. The DC/DC converter is used for boosting DC voltage of a DC source and is electrically coupled to the DC source through the filter unit. The DC/DC converter includes multiple SiC MOSFETs configured in asynchronous rectification mode by channel reverse conduction control. The inverter is used for converting the boosted DC voltage from the converter to multi-phase AC voltage through the DC link. The control unit is used for providing PWM commands to the converter and the inverter, to convert the DC voltage to AC voltage configured to drive an AC driven device.

Unless defined otherwise, technical and scientific terms used herein have the same meaning as is commonly understood by one of ordinary skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items, and terms such as "front", "back", "bottom", and/or "top", unless otherwise noted, are merely used for convenience of description, and are not limited to any one position or spatial orientation. Moreover, the terms "coupled" and "connected" are not intended to distinguish between a direct or indirect coupling/connection between two components. Rather, such components may be directly or indirectly coupled/connected unless otherwise indicated.

Figure 3:
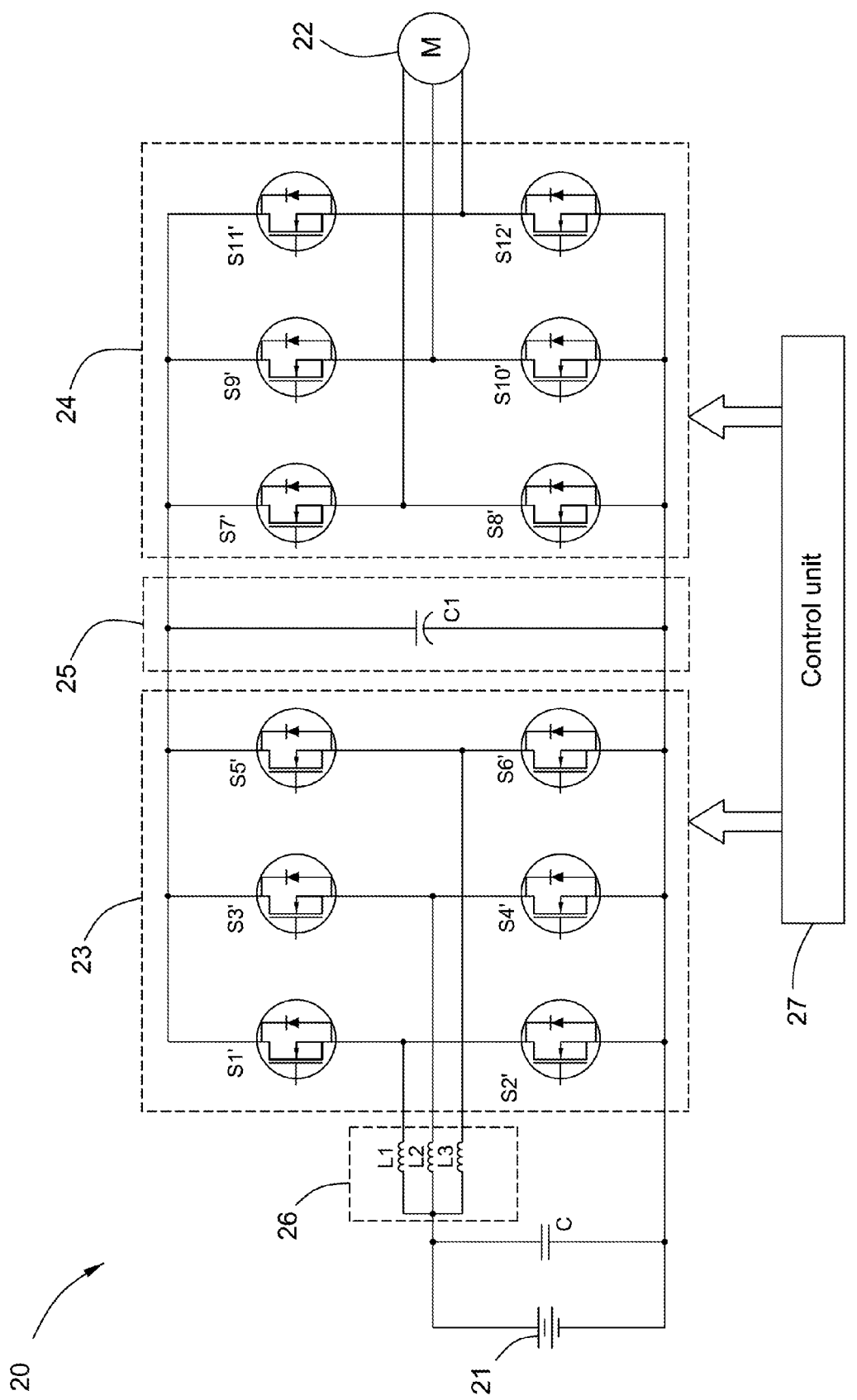
FIG. 3 is a schematic view of a power conversion system of an electric vehicle according to an embodiment.

Referring to FIG. 3, a power conversion system 20 of an electric vehicle according to an embodiment is shown. In this illustrated embodiment, the power conversion system 20 includes a DC source 21, an AC driven device 22, a three-phase DC/DC converter 23, a three-phase inverter 24, a DC link 25 including a capacitor C1, a filter unit 26, and a control unit 27. The filter unit 26 includes three inductors L1, L2, and L3 connected interleaved. The DC/DC converter 23 is used to boost DC voltage of the DC source 21 and is electrically coupled to the DC source 21 through the filter unit 26. In an embodiment, the DC source 21 represents a battery. The inverter 24 is used to convert the boosted DC voltage from the converter 23 to three-phase AC voltage through the DC link 25. The AC driven device 22 receives the converted three-phase AC voltage from the inverter 24. In an embodiment, the AC driven device 22 is a traction motor that receives the converted three-phase AC voltage from the inverter 24 to drive the electric vehicle. The control unit 27 is used to provide PWM commands to the converter 23 and the inverter 24, to convert the DC voltage to three-phase AC voltage accordingly. In some embodiments, the number of the phases of the inventor 24 and the converter 23 may vary if needed. Although the power conversion system 20 is described herein as being used in electric vehicles, the power conversion system 20 also can be used in other devices which need to be driven by AC power. Moreover, although the illustrated embodiment of the power conversion system 20 includes the DC source 21 and the AC driven device 22 for completeness, the power conversion system 20 need not be required to include these elements.

Figure 1:
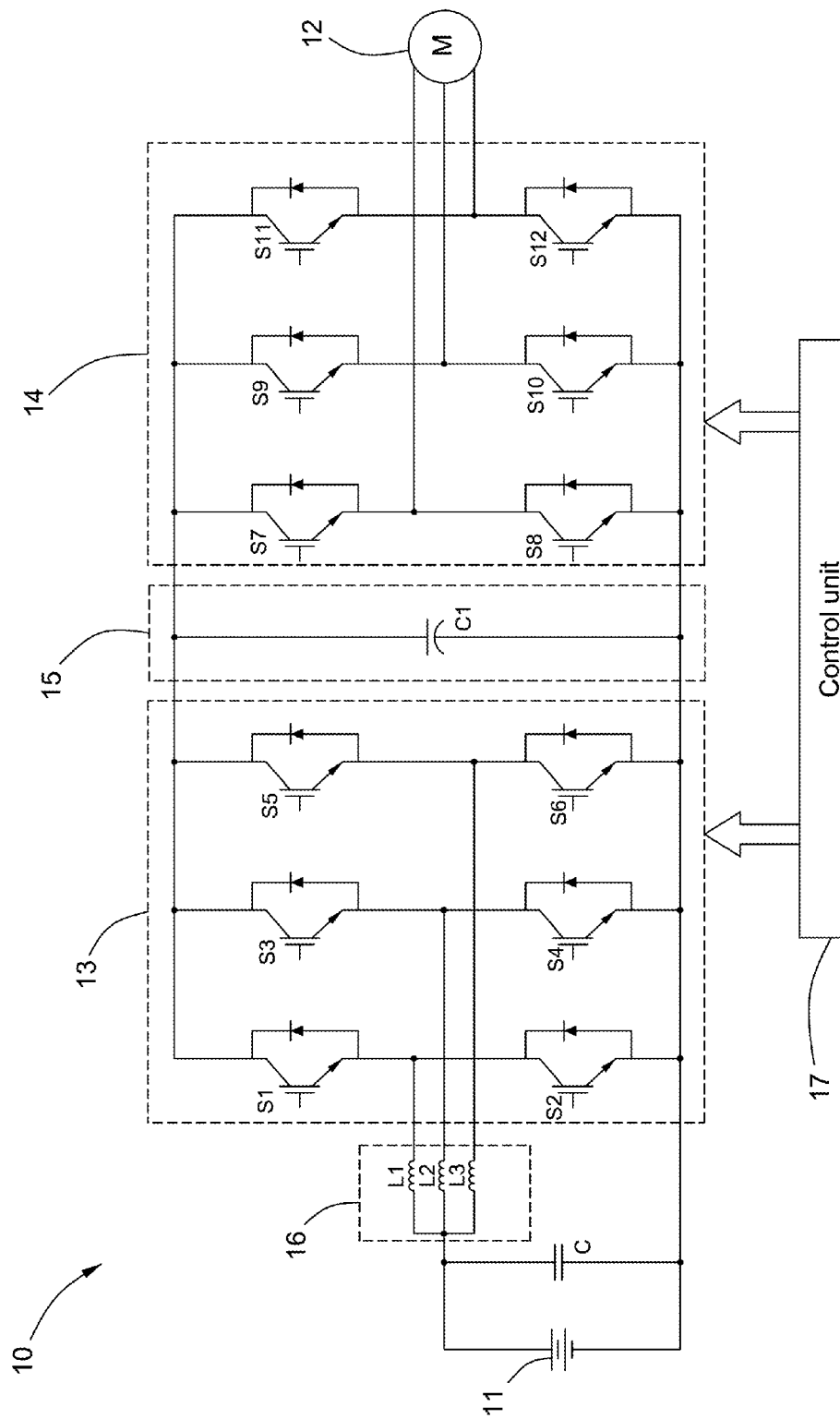
FIG. 1 is a schematic view of a conventional power conversion system of an electric vehicle.

For implementing voltage conversion, the converter 23 and the inverter 24 each includes multiple switch elements such as twelve switch elements S1'-S12' controlled by the PWM commands of the control unit 27. In the power conversion system 20, these switch elements S1'-S12' include silicon carbide (SiC) metal-oxide-semiconductor field-effect transistors (MOSFETs). Due to the SiC MOSFETs S1'-S12' have synchronous rectification (SR) mode by channel reverse conduction control, which can operate current through the SiC MOSFETs S1'-S12' along a less loss channel. In other words, with the positive gate drive signals to the gate terminals of the SiC MOSFETs' S1'-S12', each of the SiC MOSFETs S1'-S12' can be reversed channel conduction from the source terminal to the drain terminal, which can make the current pass through the less-loss channel. Therefore, compared with the conventional power conversion system 10 of FIG. 1, the SiC MOSFETs S1'-S12' will consume less energy during the energy transfer process. Thus, by using the SiC MOSFETs S1'-S12' instead of the conventional IGBTs S1-S12, the energy transfer efficiency of the power conversion system 20 is increased.

Furthermore, because the SiC MOSFETs S1'-S12' consume less energy, the heat generated by the SiC MOSFETs S1'-S12' is less than the heat generated by the conventional IGBTs S1-S12. Therefore, the number or volume of the heat sinks (not shown) arranged on the SiC MOSFETs S1'-S12' is less than the number or volume of the heat sinks arranged on the IGBTs S1-S12 of FIG. 1.

Figure 4:
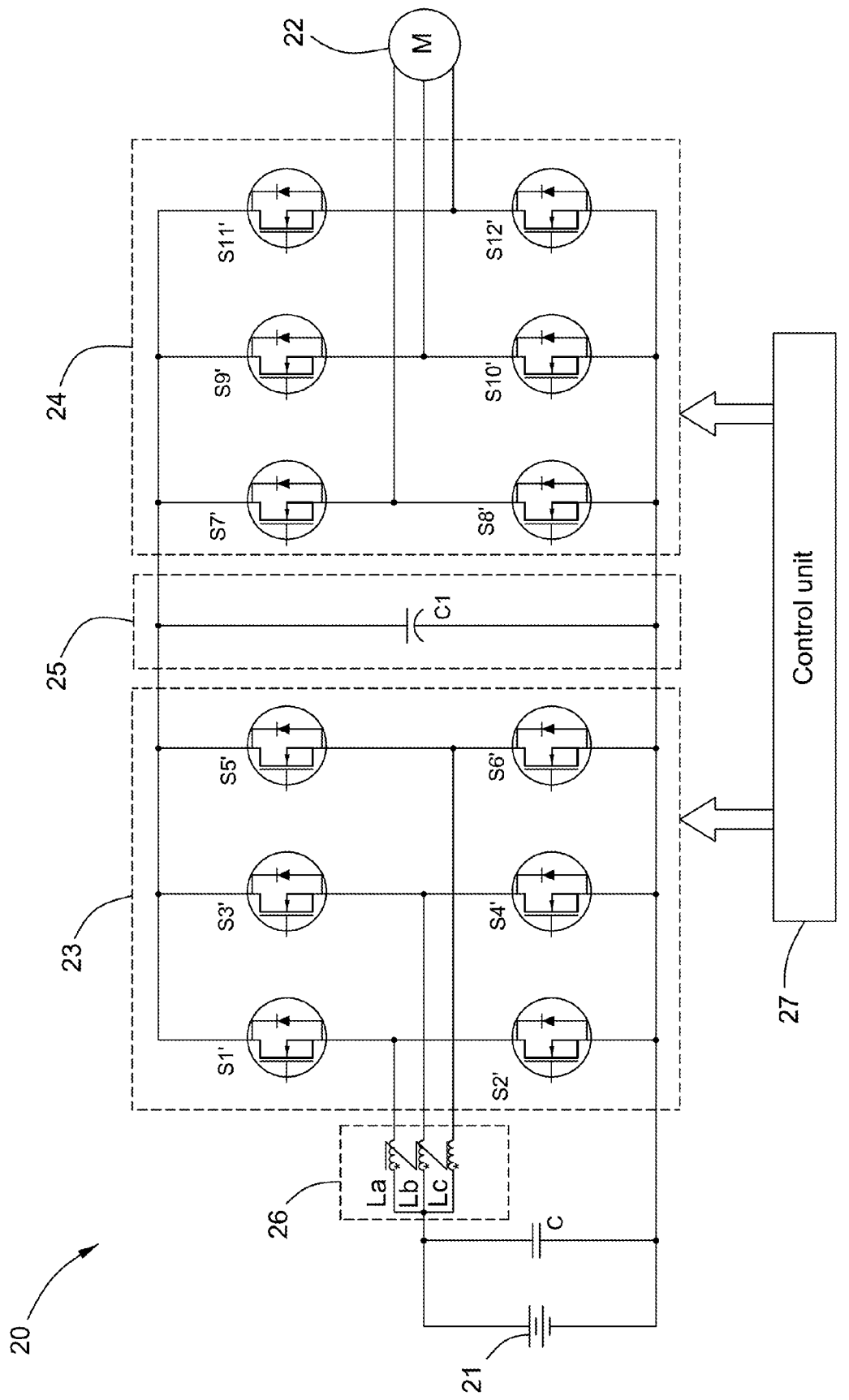
FIG. 4 is a schematic view of a power conversion system of an electric vehicle embodiment.

Referring to FIG. 4, a power conversion system 20 of an electric vehicle embodiment is shown. Compared with the embodiment of FIG. 3, this embodiment of FIG. 4 replaces the three individual inductors L1, L2, and L3 with three magnetic coupled inductors La, Lb, and Lc. The individual inductors L1, L2, and L3 each include an individual magnetic core and a coil wound on the magnetic core (not shown), thus the total number of the magnetic cores of the individual inductors L1, L2, and L3 is three. However, the three magnetic coupled inductors La, Lb, and Lc together share a common magnetic core, which can save physical space in the circuit. Furthermore, the common mode circulation current is restrained with the coupling coefficient of the three magnetic coupled inductors La, Lb, and Lc, the magnetic coupled inductors La, Lb, and Lc can restrain the loop circulation current therein compared with the three individual inductors L1, L2, and L3, which can further reduce loss. The following paragraphs will describe two detailed embodiments of the three magnetic coupled inductors La, Lb, and Lc.

Figure 5:
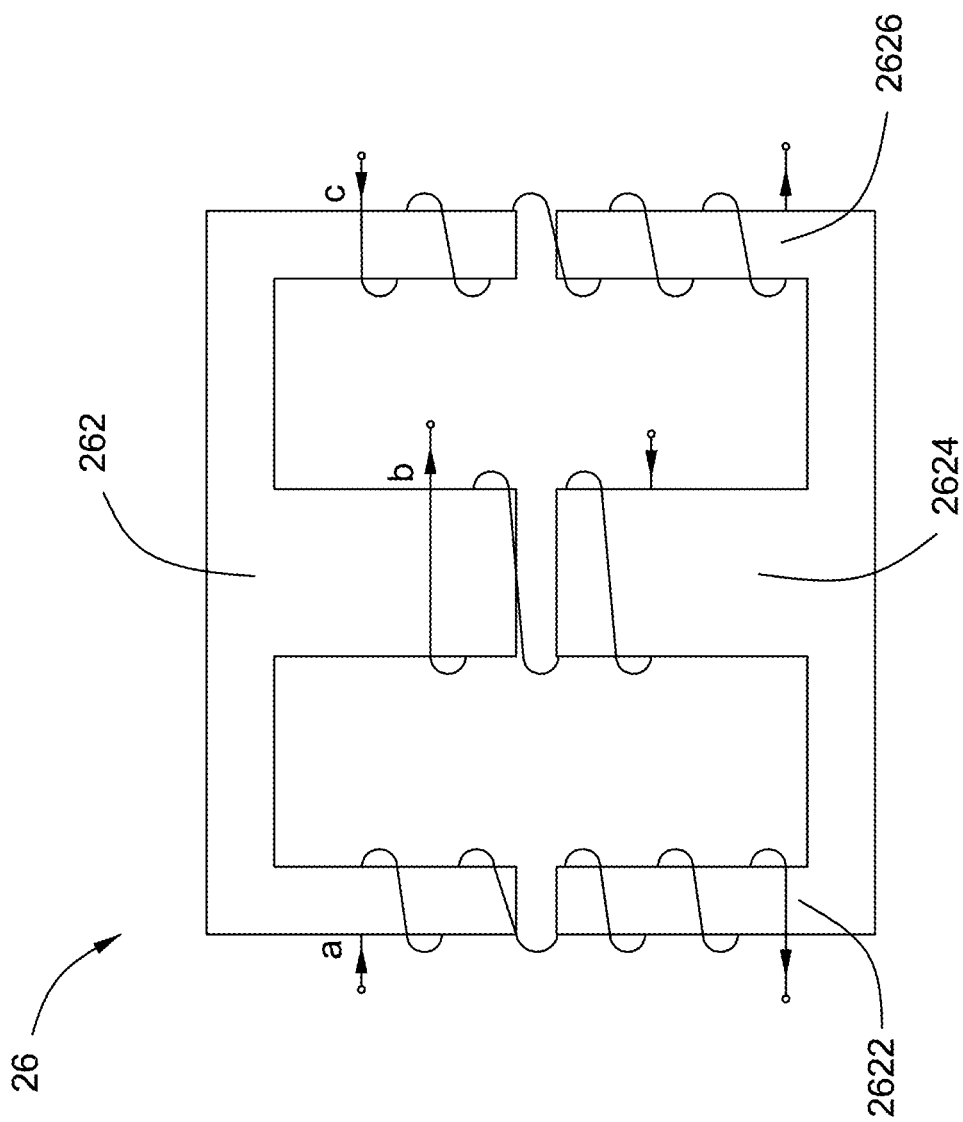
FIG. 5 is a schematic view of three magnetic coupled inductors of the power conversion system of FIG. 4 according to an embodiment.

Referring to FIG. 5, a schematic view of three magnetic coupled inductors La, Lb, and Lc of the power conversion system 20 of FIG. 4 according to an embodiment is shown. In this embodiment, the three magnetic coupled inductors La, Lb, and Lc include a shared magnetic core 262 and three coils 'a', 'b', and 'c'. The shared magnetic core 262 includes three parallel magnetic columns 2622, 2624, and 2626 electrically coupled together. The three coils 'a', 'b', and 'c' are respectively wound on the three parallel magnetic columns 2622, 2624, and 2626. In some embodiments, the number of the coils and magnetic columns may vary based on the number of phases of the converter 23 and the inverter 24.

Figure 6:
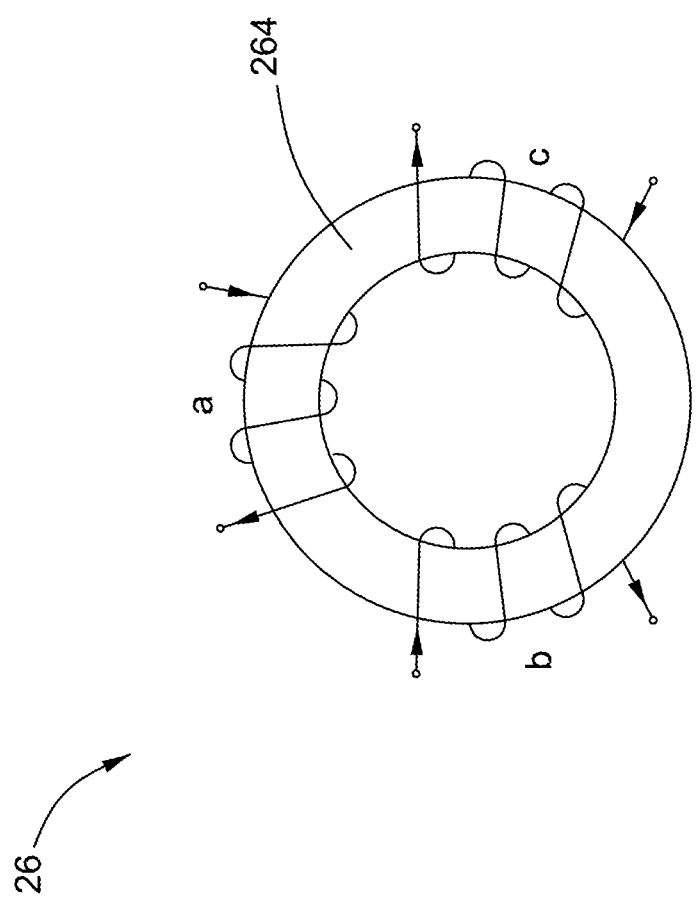
FIG. 6 is a schematic view of three magnetic coupled inductors of the power conversion system of FIG. 4 embodiment.

Referring to FIG. 6, a schematic view of three magnetic coupled inductors La, Lb, and Lc of the power conversion system 20 of FIG. 4 embodiment is shown. In this embodiment, the three magnetic coupled inductors La, Lb, and Lc include a shared magnetic core 264 and three coils 'a', 'b', and 'c'. The shared magnetic core 264 is ring-shaped. The three coils 'a', 'b', and 'c' are respectively wound on three different parts of the ring-shaped magnetic core 264 evenly. The turn ratio of the three coils 'a', 'b', and 'c' is 1:1:1. Although only two embodiments of the three magnetic coupled inductors La, Lb, and Lc are shown, the shared magnetic core may nonetheless vary according to requirements without departing from the spirit and scope of the claimed invention. In some embodiments, the number of the magnetic coupled inductors can be changed according to the number of phases of the output voltage. For example, a five-phase output voltage could utilize five magnetic coupled inductors by using similar circuit connection mentioned above.

Figure 7:
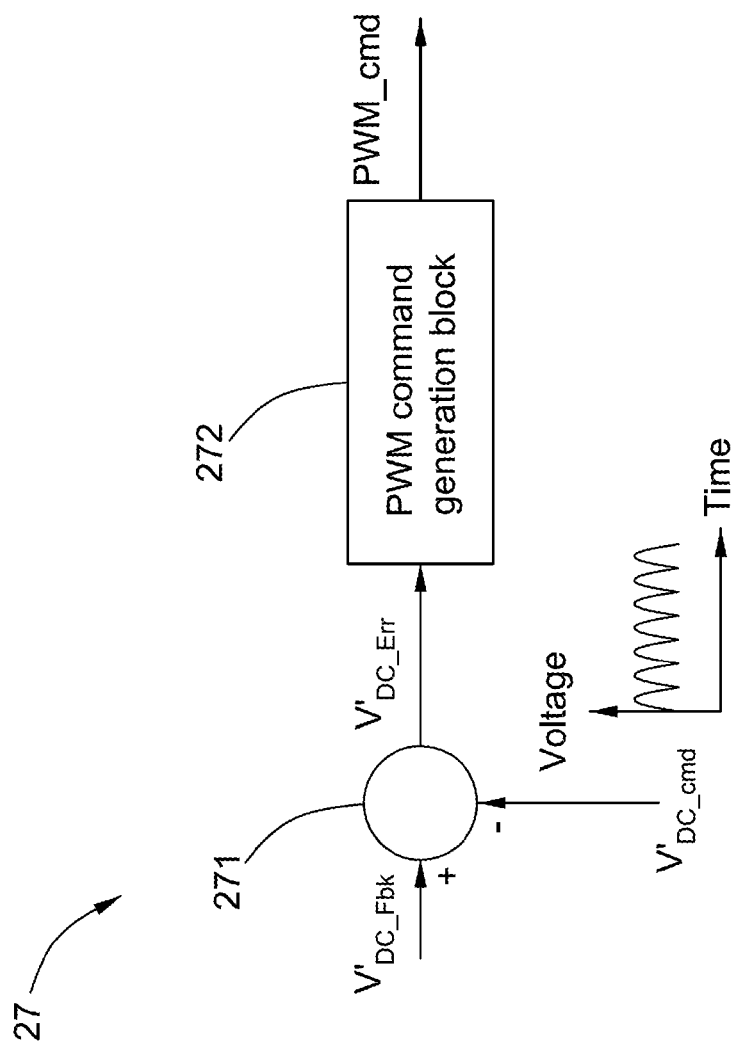
FIG. 7 is a control schematic diagram of a control unit of the power conversion system of FIG. 3, for controlling a DC/DC converter according to an embodiment.

Referring to FIG. 7, a control schematic diagram of the control unit 27 of the power conversion system 20 of FIG. 3, for controlling the DC/DC converter 23 according to an embodiment is shown. In at least some embodiments, the control unit 27 includes a difference element 271 and a PWM command generation block 272. The difference element 271 is used to obtain a DC voltage error signal $V'_{DC\_Err}$ calculated from a difference between a feedback DC voltage signal $V'_{DC\_Fbk}$ on the capacitor C1 and a predetermined DC voltage command signal $V'_{DC\_cmd}$. The PWM command generation block 272 is used to generate proper PWM commands (PWM_cmd) according to the DC voltage error signal $V'_{DC\_Err}$. The feedback DC voltage signal $V'_{DC\_Fbk}$ stands for the real measured voltage on the capacitor C1 and the predetermined DC voltage command signal $V'_{DC\_cmd}$ stands for a predetermined DC voltage.

Figure 2:
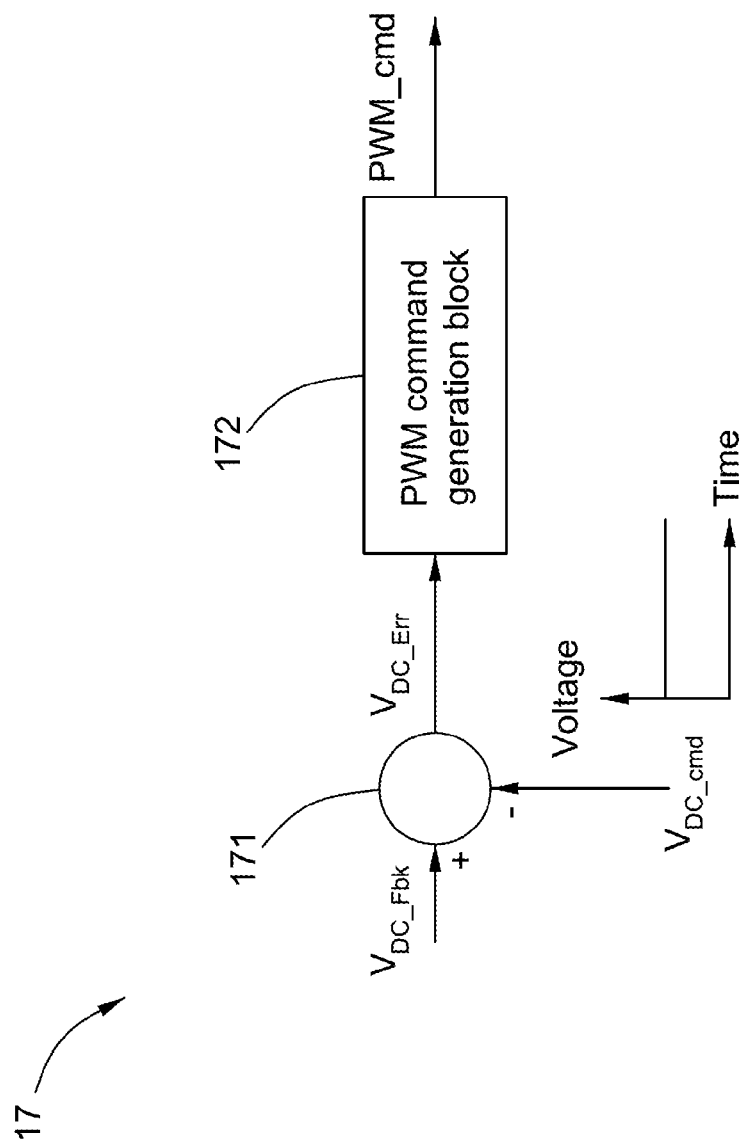
FIG. 2 is a control schematic diagram of a control unit of the conventional power conversion system of FIG. 1, for controlling a DC/DC converter.

It is understood that the PWM command generation block 272 may include some calculating elements, such as proportional integral regulators, limiters, difference elements, comparators, etc., to calculate the PWM commands (PWM cmd). Compared to the conventional predetermined DC voltage command signal $V_{DC\_cmd}$ of FIG. 2, the predetermined DC voltage command signal $V'_{DC\_cmd}$ is an active pulsation DC voltage signal (see FIG. 7), and the frequency of the pulsation DC voltage signal $V'_{DC\_cmd}$ matches the frequency of the AC voltage signal to be converted by the inverter 24. For example, the pulsation DC voltage signal $V'_{DC\_cmd}$ may be a sinusoidal wave. Because the predetermined DC voltage command signal $V'_{DC\_cmd}$ provides an active voltage pulsation control with the same frequency of the converted AC voltage, the capacitor C1 will undertake less energy converting function from DC to AC compared with the capacitor C1 utilized in the conventional power conversion system 20. This in turn reduces the capacitance of the capacitor C1 of the power conversion system 20.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

What is claimed is:

1. A power conversion system comprising:
   a filter unit;
   a multi-phase DC/DC converter for boosting DC voltage of a DC source and electrically coupled to the DC source through the filter unit, the DC/DC converter comprising a plurality of silicon carbide (SiC) metal-oxide-semiconductor field-effect transistors (MOSFETs) configured in a synchronous rectification mode by channel reverse conduction control, wherein a positive gate drive signal applied to a gate terminal of the plurality of SiC MOSFETS that are reverse channel conducted from a source terminal to a drain terminal enables current to pass through a less-loss channel of the plurality of SiC MOSFETs;
   a DC link;
   an inverter for converting the boosted DC voltage from the DC/DC converter to multi-phase AC voltage through the DC link to drive an AC driven device; and
   a control unit for providing pulse-width modulation (PWM) commands to the DC/DC converter and the inverter, wherein the commands for the DC/DC converter and inverter have the same frequency.

2. The power conversion system of claim 1, wherein the inverter comprises a plurality of SiC MOSFETs configured in a synchronous rectification mode by channel reverse conduction control.

3. The power conversion system of claim 1, wherein the inverter is a multi-phase inverter.

4. The power conversion system of claim 1, wherein the filter unit comprises a plurality of magnetically coupled inductors.

5. The power conversion system of claim 4, wherein the plurality of magnetically coupled inductors comprises a shared magnetic core and a plurality of coils wound on the shared magnetic core.

6. The power conversion system of claim 5, wherein the shared magnetic core comprises a plurality of parallel magnetic columns electrically coupled together, the plurality of coils are respectively wound on the plurality of parallel magnetic columns.

7. The power conversion system of claim 5, wherein the shared magnetic core is ring-shaped and the plurality of coils are respectively wound evenly on three different parts of the ring-shaped magnetic core.

8. The power conversion system of claim 7, wherein the turn ratio of the plurality of coils is 1.

9. The power conversion system of claim 1, wherein the control unit comprises:
   a difference element for obtaining a DC voltage error signal calculated from a difference between a feedback DC voltage signal on the DC link and a predetermined DC voltage command signal; wherein the predetermined DC voltage command signal comprises an active pulsation DC voltage signal, and the frequency of the pulsation DC voltage signal matches with the frequency of the AC voltage signal to be converted by the inverter; and
   a PWM command generation block for generating PWM commands according to the DC voltage error signal.

10. The power conversion system of claim 9, wherein the predetermined DC voltage command signal comprises a sinusoidal wave signal.

11. The power conversion system of claim 9, wherein the DC link comprises a capacitor.

12. The power conversion system of claim 9, wherein the filter unit comprises a plurality of magnetically coupled inductors.

13. The power conversion system of claim 1, wherein the DC source comprises a battery and the AC driven device comprises a traction motor applied in an electric vehicle.

* * * * *